United States Patent [19]

Tsai

[11] 4,452,592

[45] Jun. 5, 1984

[54] CYCLIC PHASE CHANGE COUPLING

[75] Inventor: Lung-Wen Tsai, Troy, Mich.

[73] Assignee: General Motors Corporation, Detroit, Mich.

[21] Appl. No.: 383,472

[22] Filed: Jun. 1, 1982

[51] Int. Cl.³ ............................................. F16D 3/04
[52] U.S. Cl. ..................................... 464/102; 464/147
[58] Field of Search .............. 464/102, 104, 147, 149, 464/73, 92

[56] References Cited

U.S. PATENT DOCUMENTS

| 1,171,347 | 2/1916 | Morse | 474/158 X |
| 1,244,533 | 10/1917 | Morse | 464/104 X |
| 1,508,085 | 9/1924 | Cooper | 464/104 X |
| 2,252,531 | 8/1941 | Tarr | 464/102 |
| 2,404,017 | 7/1946 | Wilkinson | 464/147 X |
| 2,626,812 | 1/1953 | Jones | 464/102 X |
| 2,630,341 | 3/1953 | Downey | 464/147 X |
| 2,813,409 | 11/1957 | Wolcott | 464/102 |
| 2,851,868 | 9/1958 | Larkin | 464/102 |
| 2,932,255 | 4/1960 | Newkirch | 464/104 X |
| 3,883,707 | 5/1975 | Wenzlaff | 464/102 X |
| 4,108,606 | 8/1978 | Wingard | 464/104 X |
| 4,286,442 | 9/1981 | Peterson | 464/102 X |
| 4,332,148 | 6/1982 | Maki et al. | 464/102 |

FOREIGN PATENT DOCUMENTS 25687 of 1913 United Kingdom ................ 464/104

Primary Examiner—John M. Jillions
Assistant Examiner—Daniel P. Stodola
Attorney, Agent, or Firm—Robert J. Outland

[57] ABSTRACT

A hybrid straight and curved guide phase change coupling device in which end members rotatable on spaced parallel axes in opposed spaced relation are connected by an intermediate member having guide means constraining lateral motion of the intermediate member to a straight diametrical path with respect to one of the end members and to a curved path with respect to the other of the end members whereby a cyclic phase change or velocity ratio variation is provided during rotation of the two end members at identical overall cyclic speeds.

4 Claims, 9 Drawing Figures

VELOCITY RATIO VS. INPUT DISPLACEMENT

JOINT REACTIONS VS. INPUT DISPLACEMENT

CYCLIC PHASE CHANGE COUPLING

TECHNICAL FIELD

This invention relates to drive couplings and to cyclic phase change mechanisms. In a particular aspect the invention relates to hybrid cyclic phase change coupling arrangements for opposed and offset parallel members or shafts.

BACKGROUND

Many applications are known in the art of drive couplings which utilize features of the prior art Oldham shaft coupling to connect opposed coaxial or offset parralel members or shafts for rotation at constant relative phase angles about their respective axes. Couplings of this type are shown for example in U.S. Pat. Nos. 1,244,533 and 1,171,347 Morse and 2,932,255 Neukirch. All these constructions utilize intermediate members connecting the opposed ends of members or shafts rotatable on parallel axes by opposed straight guides such as projections or tongues and grooves, keys and slots, rollers and guides and others. These guide means limit lateral motion of the intermediate members with respect to their connected members to straight paths whose axial projections intersect at right angles and cause rotation of the shafts while maintaining a fixed phase angle between them.

In U.S. Pat. No. 4,332,148 issued June 1, 1982 in the names of E.R. Maki and F. Freudenstein and assigned to the assignee of the present invention, a novel phase change coupling arrangement is disclosed which combines the simplicity of the prior Oldham coupling with novel modifications that provide rotation on offset parallel axes of connected elements with a cylic phase change variation. This Maki-Freudenstein phase change device differs from the generalized form of the prior Oldham coupling in that connection of an intermediate member with opposed members rotatable on offset parallel axes is accomplished by curved path guide means intersecting at an arbitrary selected angle rather than the right angled straight guide means of the Oldham coupling. To distinguish it from the straight guide Oldham coupling, I have referred to this novel phase change device as a "curved guide coupling".

In operation of a curved guide coupling, the phase angle change may be made adjustable from zero to a predetermined maximum by allowing variation of the displacement of the offset rotational axes of the connected end members. The form and amount of phase angle variation is determined in part by the selected phase angle between the curved path guide means and by the curvatures of those guide means. The circular arc form of the mechanism is kinematically equivalent to a four bar linkage as will be subsequently more fully discussed.

SUMMARY OF THE INVENTION

The present invention comprises a new hybrid form phase change coupling device which utilizes an intermediate member connected to opposed members rotatable on offset parallel axes wherein the connection with one of the end members is through straight path guide means while the connection with the other of the end members is through curved path guide means. Thus, the new coupling arrangement combines coupling elements of both the well known Oldham coupling and the recent curved guide coupling to provide an improved form of phase change coupling device for general use.

Like the Maki-Freudenstein curved guide coupling, the Tsai hybrid coupling of the present invention permits rotation on offset parallel axes of connected elements with a cyclic phase change variation. However, the new hybrid coupling can provide a more even phase change pattern which more closely corresponds to sinusoidal variation than does that of the curved guide coupling. Further, the drive reaction forces on the guide elements of the hybrid coupling may be more evenly shared by opposite ends of the output member guide means than in the case with a comparable curved guide coupling device. Kinematically, the circular arc form of the hybrid phase change coupling is equivalent to a turning block linkage, which is a special form of four bar linkage as will be subsequently more fully discussed.

These and other features of the invention will be more fully understood from the following description of certain preferred embodiments taken together with the accompanying drawings.

BRIEF DRAWING DESCRIPTION

DETAILED DESCRIPTION

Figure 1:
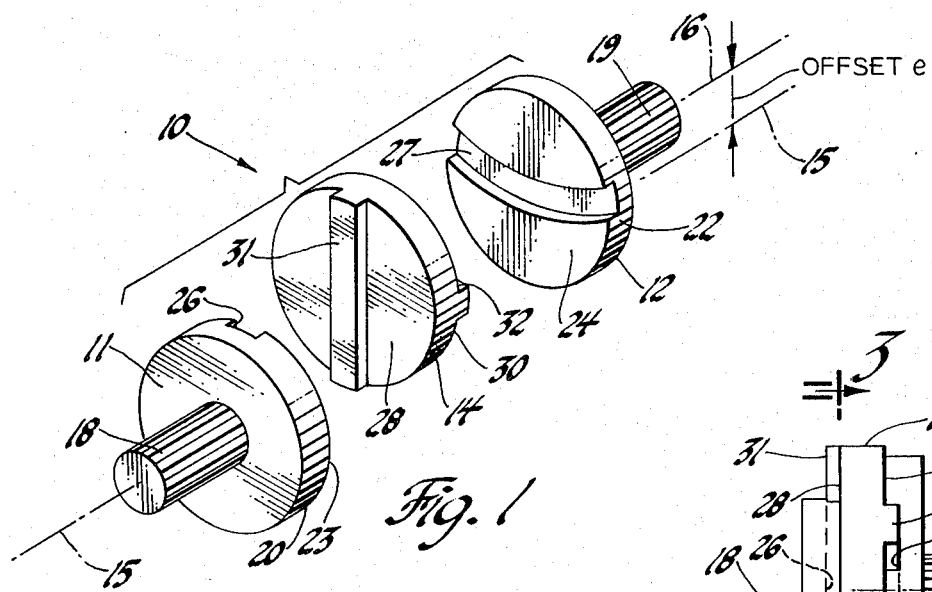
FIG. 1 is an exploded pictorial view of a hybrid cyclic phase change coupling formed in accordance with the invention.
Figure 2:
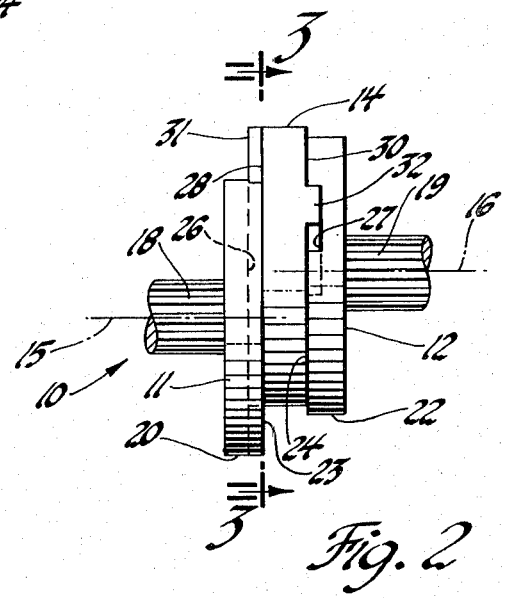
FIG. 2 is a side view of the assembled coupling of FIG. 1.

Referring now to the drawings in detail, numeral 10 generally indicates an exemplary embodiment of hybrid cyclic phase change coupling formed in accordance with the present invention. Coupling 10 consists of three simple elements, first and second end members 11 and 12 respectively and an intermediate member 14 which, in the illustrated embodiment, may be referred to as a coupling disk.

The end members 11 and 12 are rotatable about offset parallel axes 15, 16 respectively and include splined connector portions 18, 19 for respectively connected the end members 11, 12 with separate rotatable shafts or other elements. The end members each also include disk like end portions 20, 22 having axially spaced and opposed end faces 23, 24 respectively. A straight sided groove 26 extends diametrically across the end face 23 of end member 11 while an arcuately curved groove 27 extends laterally across the face 24 of the second end member 12.

The intermediate member 14 is also of disk like shape having axially oppositely directed end surfaces 28, 30 which, in assembly, respectively engage in opposed relation end faces 23, 24 of the respective end members 11, 12. A straight sided key or projection 31 extends diametrically across the end surface 28 of the intermediate member to engage, in assembly, the straight groove 26 of the end member 11 while an arcuately curved key or projection 32 extends laterally across end surface 30 of the intermediate member to engage, in assembly, arcuate groove 27 in the second end member 12.

The grooves 26, 27 and their respective keys or projections form interacting guide means which limit lateral movement of the intermediate member with respect to the first member to a diametral straight path 34 aligned with the interengaging straight groove and projection and further limit lateral movement of the intermediate member with respect to the second end member to an arcuately curved path 35 corresponding to the curvature of the interengaging arcuately curved key and groove. The keys or projections are preferably fitted closely but freely within the grooves so that relative oscillation of the intermediate member with respect to the end members may occur while the guide means act to conduct driving torque from one of the end members acting as a drive member through the intermediate member to the other end member acting as a driven member.

Figure 3:
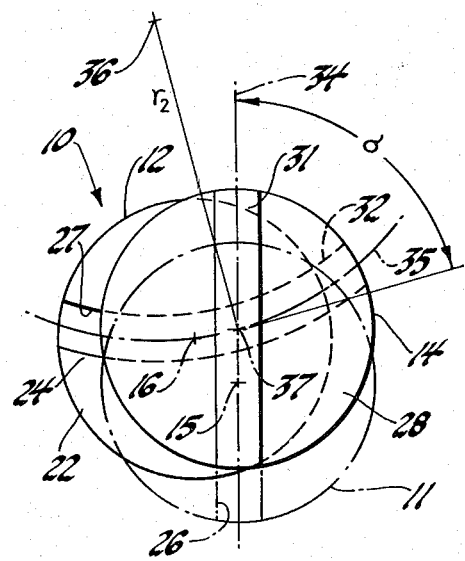
FIG. 3 is a transverse cross-sectional view of the coupling assembly from the plane indicated by the line 3—3 of FIG. 2.

It should be observed that, as best shown in FIG. 3, the curved path 35 of the curved guide means is formed with a radius $r_2$ having a center of curvature 36 which may be on, or displaced from, the straight path 34 of the straight guide means. The curved and straight paths intersect, as projected axially upon a common transverse plane, with an angle $\sigma$ at a point 37 which lies within the lateral boundaries of the intermediate member.

In operation, rotation of the end member 11 on its axis 15 causes concurrent rotation of the intermediate members 14 through the interlocking engagement of the straight groove 26 and projection 31. At the same time, the engagement of the curved projection 32 with groove 27 of end member 12 causes rotation of the latter whenever the intermediate member 14 is rotated.

Since end members 11 and 12 rotate on spaced parallel axes 15 and 16 respectively, the intermediate member 14 must oscillate with respect to the end members along the straight and curved paths of their associated guide means. Thus, the intermediate member moves in an orbital path which is determined in part by the curvature of the arcuate path defined by the curved guide means and the angle of intersection $\sigma$ between the curved and straight paths. The amount of offset between the axes 15, 16 of the end members is also a determining factor in this relationship. The reselt is that when the input shaft or driving end member 11 is rotated at a constant speed, the output shaft rotates at the same overall speed of revolution but with a cyclically varying phase angle and velocity ratio with respect to the input shaft.

Figure 4:
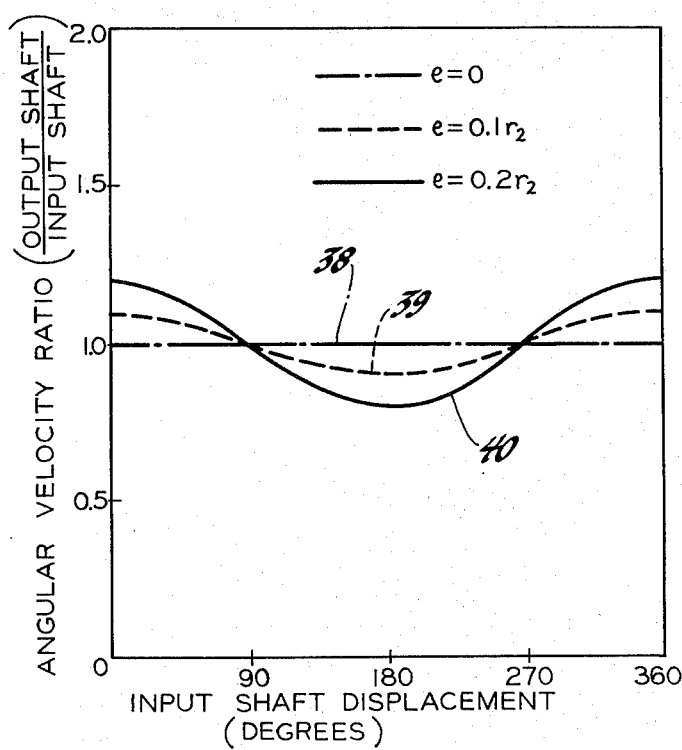
FIG. 4 is a graphical illustration of the variation in angular velocity ratio versus input shaft displacement with varying amounts of eccentricity of the input and output shaft axes.

For example, Figure 4 shows graphically by the lines 38, 39, 40 exemplary relationships between the angular velocities of an output shaft or end member 12 relative to an input shaft or end member 11 at various eccentricities e over the range of input shaft angular displacement of a complete 360° cycle of revolution. The line 38 indicates that when the offset or eccentricity e of the shaft axes is zero, the angular velocity ratio of the output to input shaft remains unity so there is no phase angle variation. However, as the eccentricity or offset of the end member shaft axes is increased by 10% of the radius of curvature $r_2$ as shown by line 39 and to 20% of $r_2$ as shown by line 40, the angular velocity ratio varies at varying displacements to create a phase angle variation pattern that, in the present instance, approaches a sinusoidal pattern.

The amount of cyclic phase change and the specific pattern involved will, of course, be determined by selection of the angle $\sigma$ and the curvature of the curved path 35 of the curved guide means, as well as by the displacement between the parallel axes 15, 16. Adjustment of any of these factors is capable of varying the phase change pattern. Adjustment of the displacement could, for example, be provided for by making the rotational axis of one of the end members movable with respect to the other. By using two phase changers in series or combining a single phase changer with other mechanisms, an extended range and variety of phase fluctuations can be obtained.

ALTERNATIVE EMBODIMENTS

It should be understood that the groove and projection guide means of the previously described embodiment are merely exemplary of the many forms of guide means that might be provided between an intermediate member and associated end members in order to restrict lateral movement of the intermediate member to predetermined straight and curved paths with respect to the end members. Also the form of the curved path, although defining an arc of a circle in the just described embodiment, need not be so limited as it is possible, to obtain a desired phase change result, to utilize guide means limiting lateral motion between one of the end members and the intermediate member to curved paths of other desired practical forms. Even a combination path which is partially straight and partially curved is possible. As to the guide means themselves, these may take an acceptable form from the simple key and groove arrangements of the just described embidiment to any of the forms shown in the prior art Oldham coupling devices, as well as other forms of lateral guide restraints including mechanical, electric or magnetic guiding arrangements.

Figure 5:
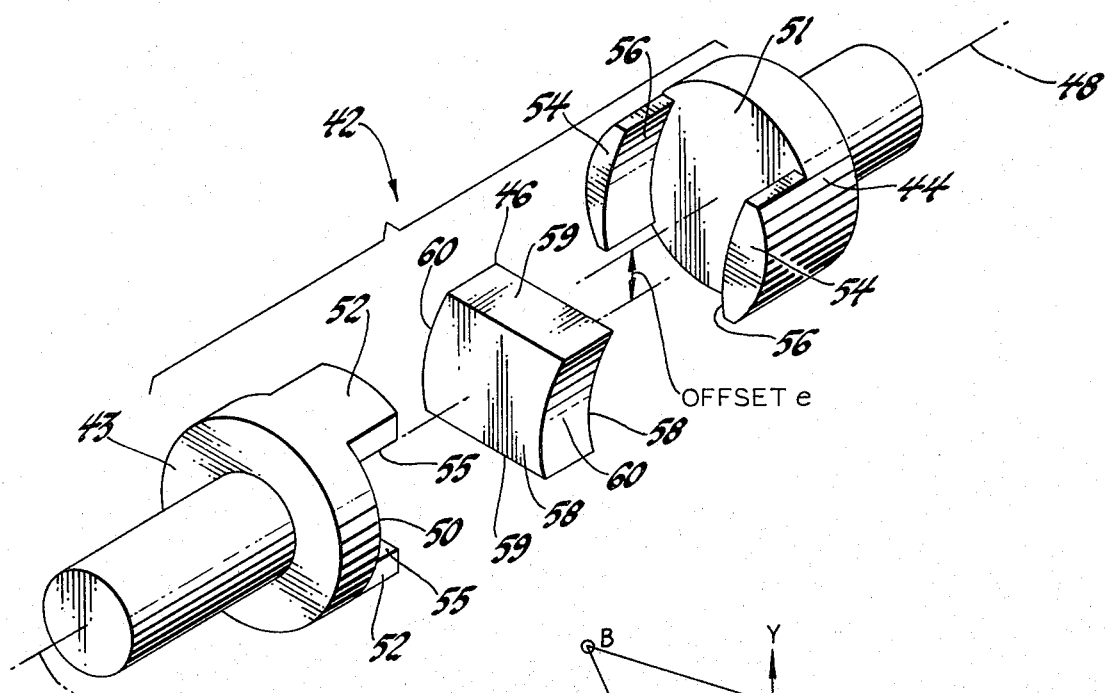
FIG. 5 is an exploded pictorial view of an alternative embidiment of hybrid phase change coupling formed in accordance with the invention.

An example of an alternative construction of coupling and guide means in a phase change mechanism in accordance with the present invention is shown in FIG. 5. Numeral 42 represents the phase change coupling shown in exploded pictorial form. The coupling 42 includes first and second end members 43, 44 respectively and an intermediate or coupler block member 46 having the shape of a deformed cube.

End members 43, 44 are mounted for rotation on offset parallel axes 47, 48 respectively. The end members have opposed spaced end faces 50, 51 respectively from each of which protrude a pair of laterally oppositely spaced, longitudinally extending abutments 52, 54 respectively. Abutments 52 of the end member 43 are formed with laterally oppositely disposed inwardly facing flat guide surfaces 55, while abutments 54 of end member 44 are formed with laterlly oppositely disposed inwardly facing curved guide surfaces 56 which are preferably arcuately shaped from a common laterlly displaced center (not shown). In assembly, the abutments or tines 52, 54 are longitudinally overlapped and circumferentially spaced to define a deformed cubical space between the end faces 50, 51 and the guide surfaces 55, 56, in which space the deformed cubical intermediate member 46 is received.

Member 46 is provided with a pair of flat parallel end surfaces 58 which, in assembly, lie in close opposed relationship with the end faces 50, 51 of the end members. Block 46 also includes a pair of opposite flat parallel side surfaces 59 which, in assembly, lie in closely opposed engaging relation with the flat guide surfaces 55 of end member 43. Finally, intermediate member 46 includes a pair of opposed curved side surfaces 60 which, in assembly, lie in closely opposed engaging relation with the curved guide surfaces 56 of the end member 44 and have curvatures matching those of the opposed end member guide surfaces.

The operation of the alternative embodiment of FIG. 5 is fundamentally the same as that of the previously described construction. Engagement of the block side surfaces 59, 60 with the associated guide surfaces of the end members 43, 44 causes rotation of the two end members and the intermediate block member at equal overall cyclic speeds. During such rotation, the intermediate block member moves in an orbiting path determined by the offset of the end member axes and the relative positions of the curved and straight paths of constraint for relative lateral motion of the intermediate member with the respective end members. These lateral constraint paths are defined by the shapes and relative positions of the end member guide surfaces and the corresponding side surfaces of the intermediate member. By this construction, a variation in instantaneous phase angle between the end members may be obtained in the same manner as mentioned in respect to the first described embodiment.

It should be noted that the embodiment of FIG. 5 represents a modification of a form of Oldham coupling balancer device described in my copending United States patent application Ser. No. 343,450 filed Jan. 28, 1982 and assigned to the assignee of the present invention. The disclosure of that application also illustrates the use of internal passages in the end and intermediate members to distribute lubricant from external means to the opposed bearing side and guide surfaces of the intermediate and end members respectively which, it should be apparent, could also be incorporated in the described embodiment of phase change coupling or in alternative forms of couplings if desired.

KINEMATIC RELATIONSHIPS

Figure 6:
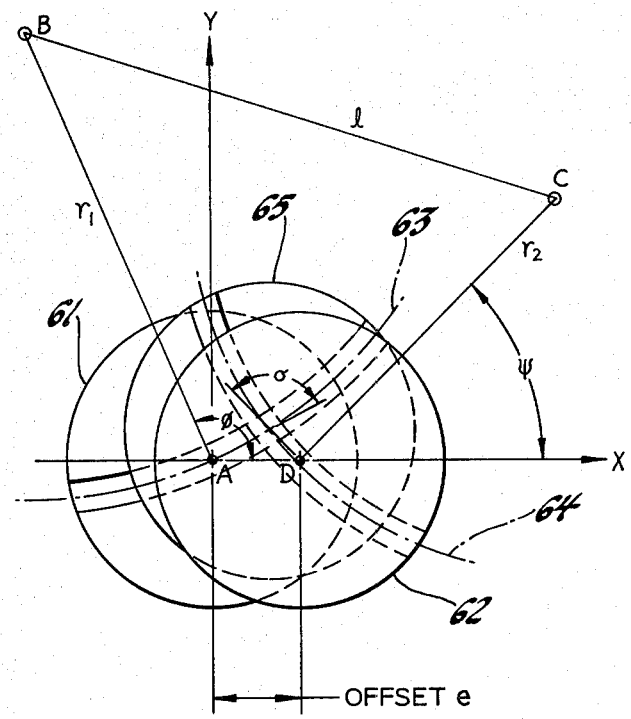
FIG. 6 is a schematic illustration of the prior curved guide coupling arrangement indicating its construction and equivalency to a four bar linkage.
Figure 7:
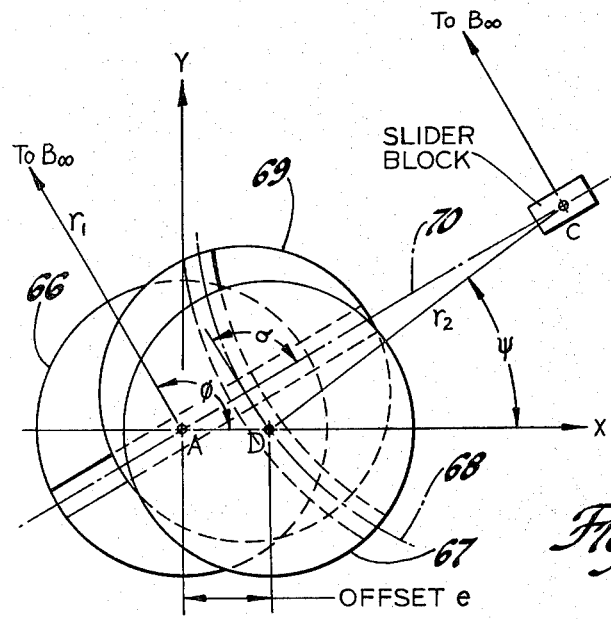
FIG. 7 is a schematic illustration of the present hybrid phase change coupling device illustrating its kinematic equivalency to a turning block linkage.

Referring now to FIGS. 6 and 7 of the drawings, there are shown graphical illustrations comparing the kinematic characteristics of the curved guide phase change coupling arrangement of the previously mentioned U.S. Pat. No. 4,332,148 and the hybrid straight and curved guide coupling of the present invention.

The curved guide coupling arrangement of FIG. 6 is kinematically equivalent to a four bar linkage defined by the pivots A, B, C and D. Pivots A and D represent the spaced parallel axes of rotation of the end members 61, 62 while the pivots B and C represent the centers of curvature, having radii $r_1$ and $r_2$ respectively, for the circular arcuately curved paths 63, 64 of the guide means which intersect at angle $\sigma$ and provide lateral constraint between the end members 61, 62 and the associated intermediate member 65 of the phase change coupling. X and Y represent the graphical horizontal and vertical axes while $\phi$ and $\psi$ represent the instantaneous angles of the radii $r_1$ and $r_2$ at one point of rotation of the coupling. It will be observed that radii $r_1$ and $r_2$ also represent links which rotate with their respective end members 61, 62 on their respective axes A, D and centers B and C are connected by a restraining link l completing the four bar linkage that is equivalent to the curved guide coupling in U.S. Pat. No. 4,332,148.

The hybrid straight and curved guide coupling arrangement of the present invention, shown in FIG. 7, is kinematically equivalent to a turning block linkage defined by the pivots A, C and D and the slider block at C. In this embodiment, pivots A and D again represent the spaced parallel axes of the end members 66, 67 and $r_2$ represents the radius of curvature from the center C of the circular arcuately curved path 68 of arcuate guide means connecting the intermediate member or coupler disk 69 with the output end member or disk 67. The turning block linkage arrangment represents a special case of the four bar linkage wherein radius $r_1$ is infinitely long, yielding a straight path 70 for guide means between the input end member or disk 66 and the intermediate member 69 so that, upon rotation, the slider block C effectively reciprocates along the straight path 70 of the straight guide means while rotating with the output disk 67 at the end of the radial link $r_2$. In FIG. 7, the angle $\sigma$ also represents the angle of intersection of the curved and straight guide paths 68, 70 and symbols X Y, $\phi$ and $\psi$ have the same meanings as in FIG. 6.

Figure 8:
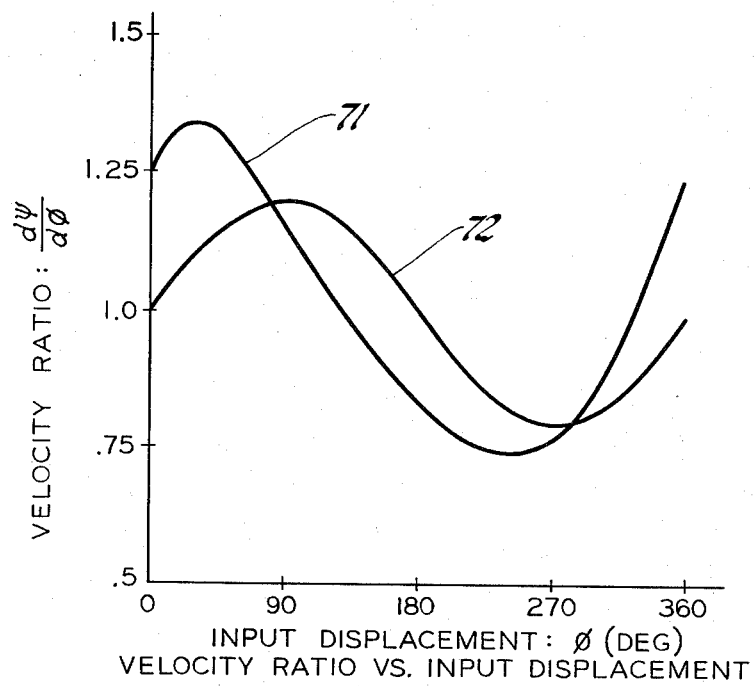
FIG. 8 is a graphical comparison of the phase change ratios of a curved guide coupling and a comparable hybrid coupling of the present invention.

FIG. 8 presents a comparison of the instantaneous velocity ratios versus angular displacement of the input end member or disk for the curved guide coupling of FIG. 6, indicated by the line 71, and the hybrid coupling arrangement of FIG. 7, indicated by line 72. In these examples, both configurations have identical angles $\sigma$ of 90° and eccentricities e of one unit, while the length of radius link $r_2$ is five units. They differ, however, in that the radius $r_1$ of the curved guide coupling is five units while the comparative radius $r_1$ of the hybrid coupling is infinity, as a result of the straight guide means.

Comparing the lines 71 and 72, it may be seen that the change in velocity ratio of curved coupling line 71 is somewhat greater and the sharpness of directional changes is significantly greater than the equivalent characteristics of the comparatively smoother, more balanced approximately sinusoidal line 72 of the hybrid coupling arrangement.

Figure 9:
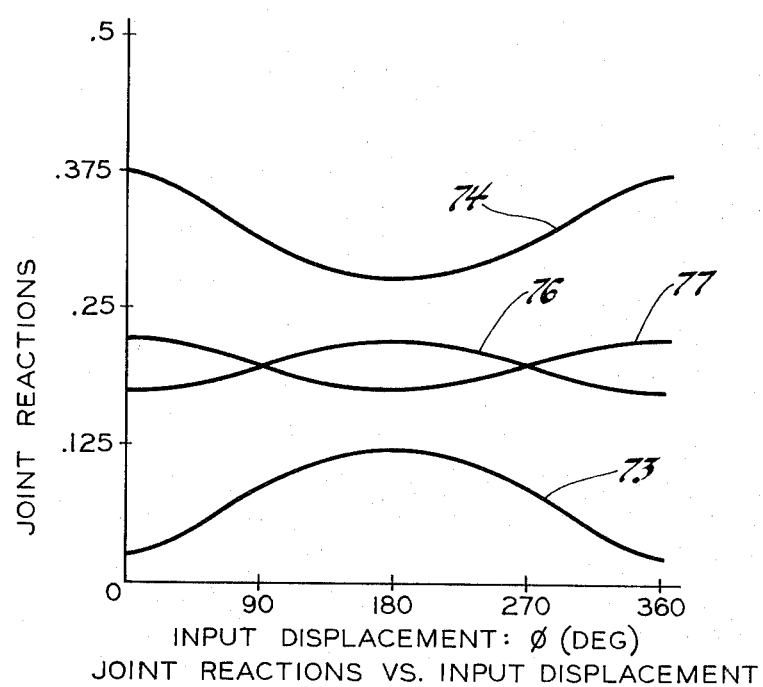
FIG. 9 is a graphical comparison of the joint reaction forces of the comparable curved guide and hybrid couplings of FIG. 8.

FIG. 9 provides a comparison of the tongue loads or joint reactions of the two coupling arrangements of FIGS. 6 and 7 versus input displacement. In the figure, lines 73 and 74 represent the loads at the opposite ends of the output member for the curved guide coupling of FIG. 6 while lines 76 and 77 represent the comparable loads for the hybrid coupling of FIG. 7. It can be seen that the tongue loads for the modified coupling are relatively evenly distributed while those of the curved guide coupling differ by a factor of more than two to one.

In view of the different results obtained from the two types of couplings illustrated in FIGS. 6 and 7, it should be apparent that the differing load and phase change characteristics of the curved guide and hybrid couplings may each have advantages for application in various types of phase change coupling devices for use in a variety of situations which may be contemplated by those skilled in the art.

While the invention has been described by reference to certain specific embodiments and configurations, it should be apparent that numerous changes may be made within the scope of the inventive concepts described. It is accordingly intended that the invention not be limited to the disclosed embodiments but that it have the full scope permitted by the language of the following claims.

The embodiments of the invention in which an exclusive property or privilege is claimed are defined as follows:

1. A cyclic phase change coupling for connecting two bodies for rotation at equal cyclic velocities while producing predetermined variations in relative phase angle between the bodies during each cycle of revolution, said coupling comprising first and second end members rotatable in opposed spaced relation on offset parallel axes, an intermediate member disposed in the space between said opposed end members and capable of lateral and rotational motion in said space, said intermediate member being laterally and rotationally keyed to both of said end members by means comprising straight guide elements between the intermediate and first end members that limit relative lateral motion between said intermediate and first end members to a straight path and arcuately curved guide elements between the intermediate and second end members that limit relative lateral motion between said intermediate and second end members to a curved path, said curved and straight lateral paths lying in planes normal to the axes of their respective end members and the axial projections of said lateral paths defining a predetermined angle of intersection within the lateral boundaries of said intermediate member, said angle of intersection and curvature of said curved guide elements being selected to provide said predetermined phase angle variations between the end members during each revolution of the coupling.

2. A cyclic phase change coupling for connecting two bodies for rotation at equal cyclic speeds but providing a phase angle variation during each cycle, said coupling comprising first and second members rotatable on offset parallel axes and having opposed ends, an intermediate member axially aligned with the ends, first guide means connected said intermediate member with said first member and limiting their relative lateral motion to a straight path, and second guide means connecting said intermediate member with said second member and limiting their relative lateral motion to a curved path, said straight and curved paths, as projected axially upon a common transverse plane, intersecting at a point within the lateral boundaries of said intermediate member, the relative angle of said paths and the curvature of said curved path being such as to cause a predetermined cyclic variation in phase angle between said first and second members upon rotation thereof and the consequent lateral oscillation along said paths of the intermediate member relative to the first and second members.

3. A cyclic phase change coupling for connecting two bodies for rotation at equal cyclic speeds but providing a phase angle variation during each cycle, said coupling comprising first and second members rotatable on offset parallel axes and having opposed ends, an intermediate member axially aligned with the ends, first guide means connecting said intermediate member with said first member and limiting their relative lateral motion to a straight path, and second guide means connecting said intermediate member with said second member and limiting their relative lateral motion to a curved path defining an arc of a circle.

said straight and curved paths, as projected axially upon a common transverse plane, intersecting at a point within the lateral boundaries of said intermediate member, the relative angle and configuration of said paths being such as to cause a predetermined cyclic variation in phase angle between said first and second members upon rotation of the coupling and the consequent lateral oscillation along said paths of the intermediate member relative to the first and second members.

4. The coupling of claims 1, 2 or 3 wherein the offset between said parallel axes is variable to vary the phase angle change between said end members.

* * * * *